(12) United States Patent
Kim

(10) Patent No.: US 8,146,721 B2
(45) Date of Patent: Apr. 3, 2012

(54) SELF LEVELING SHOCK ABSORBER

(75) Inventor: Nam Ho Kim, Bucheon-si (KR)

(73) Assignee: Mando Corporation, Pyeongtaek-si (KR)

( * ) Notice: Subject to any disclaimer, the term of this patent is extended or adjusted under 35 U.S.C. 154(b) by 466 days.

(21) Appl. No.: 12/398,562

(22) Filed: Mar. 5, 2009

(65) Prior Publication Data

US 2009/0223761 A1 Sep. 10, 2009

(30) Foreign Application Priority Data

Mar. 5, 2008 (KR) .................. 10-2008-0020322

(51) Int. Cl.
*F16F 9/34* (2006.01)
*B60G 17/044* (2006.01)
(52) U.S. Cl. ................ 188/322.14; 188/315; 267/64.17
(58) Field of Classification Search .............. 188/313, 188/314, 315, 322.13, 322.14; 267/64.11, 267/64.15, 64.16, 64.17
See application file for complete search history.

(56) References Cited

U.S. PATENT DOCUMENTS

| | | | | |
|---|---|---|---|---|
| 5,797,594 A | * | 8/1998 | Sekine et al. | 267/64.17 |
| 6,270,064 B1 | * | 8/2001 | Tachikawa | 267/64.15 |
| 6,651,788 B1 | | 11/2003 | Wohlfarth | |
| 7,025,184 B2 | * | 4/2006 | Baba | 267/64.16 |
| 7,344,127 B2 | * | 3/2008 | Beck | 267/64.17 |
| 2008/0185244 A1 | * | 8/2008 | Maeda et al. | 188/316 |

FOREIGN PATENT DOCUMENTS

| | | | |
|---|---|---|---|
| GB | 2035511 A | * | 6/1980 |
| JP | 3223536 A | | 10/1991 |
| JP | 2008082491 A | | 4/2008 |

* cited by examiner

*Primary Examiner* — Thomas J Williams
(74) *Attorney, Agent, or Firm* — McDermott Will & Emery LLP

(57) ABSTRACT

A self leveling shock absorber includes a base shell, an inner tube in the base shell, having a low pressure chamber between the shell and the inner tube, a piston rod in the inner tube and having a hollow portion with an upper portion closed, a piston valve coupled to the piston rod, dividing space in the inner tube into rebound and compression chambers. An outer tube installed to a lower portion of the inner tube having a high pressure chamber and a gas chamber between the shell and the outer tube. A diaphragm divides the high pressure chamber from the gas chamber. A body valve is installed to a lower end of the inner tube to control flow of fluid between the low pressure chamber and the high pressure chamber, and a pump rod is provided having a hollow portion and one end installed to the body valve and another end inserted into the hollow portion of the piston rod. A relief valve is positioned under the pump rod.

2 Claims, 2 Drawing Sheets

SELF LEVELING SHOCK ABSORBER

BACKGROUND

1. Technical Field

The present disclosure relates to a self leveling shock absorber, and more particularly, to a self leveling shock absorber with a relief valve positioned to prevent the relief valve from escaping and securely maintain an assembling condition of a pump rod.

2. Description of the Related Art

In general, a shock absorber is a vibration-proof or shock absorbing device installed between a vehicle body and an axle to absorb vibrations or shocks transmitted from a road surface to the axle when the vehicle is driven and thus to improve a ride comfort. This shock absorber rapidly absorbs vibrations of a spring generated by a road surface when the vehicle is driven to ensure the handling stability of the vehicle and provide the ride comfort.

In addition, as a technique for a shock absorber has been developed, the aforementioned shock absorber has a function of keeping a vehicle height substantially constant regardless of the number of passengers or weight of baggage as well as absorbs shocks exerted on a vehicle. Such a shock absorber is referred to as a self leveling shock absorber.

In the meantime, an inside of the self leveling shock absorber is divided into a high pressure chamber and a low pressure chamber, and vibrations are absorbed by damping force generated by oil flowing in the high pressure chamber and the low pressure chamber.

FIG. 1 is a cross-sectional view of a self leveling shock absorber according to a prior art.

As shown in FIG. 1, a conventional self leveling shock absorber 1 comprises a base shell 10, an inner tube 12 installed in the base shell 10, and an outer tube 14 installed between the base shell 10 and the inner tube 12 in a longitudinal direction.

In addition, the self leveling shock absorber 1 comprises a rod guide 16, a hollow piston rod 20, a piston valve 30 and a body valve 40 which are assembled to the inner tube 12, a pump tube 21 and a pump rod 22 which are installed in the hollow piston rod 20, and an inlet valve 23 and an outlet valve 24 which are respectively provided toward one end of the pump rod 22 and one end of the pump tube 21. Also, a pump chamber 25 is defined in an empty space between the pump tube 21 and the pump rod 22.

The piston valve 30 divides an internal space of the inner tube 12 into a rebound chamber 13 and a compression chamber 15 and controls the oil flow between the rebound chamber 13 and the compression chamber 15.

A low pressure chamber 11 to be filled with oil is defined between the base shell 10 and the inner tube 12, and a gas chamber 18 and a high pressure chamber 19 that are separated by a diaphragm 17 are provided between the base shell 10 and the outer tube 14, wherein the high pressure chamber 19 is compressed by the gas chamber 18.

Upper and lower ends of the diaphragm 17 are restrained by an upper holder 17a and a lower holder 17b installed between the outer tube 14 and the base shell 10. In addition, installed to the upper holder 17a is a relief valve 35, which returns oil of the high pressure chamber 19 to the low pressure chamber 11 to maintain the pressure in the high pressure chamber 19 when the pressure in the high pressure 19 is excessively increased.

However, in the prior self leveling shock absorber of FIG. 1, since the relief valve 35 is press-fitted into the upper holder 17a, there are problems in that the mounting space is narrow and the relief valve 35 may escape from the upper holder 17a when high pressure is instantaneously generated.

Further, in the conventional prior self leveling shock absorber of FIG. 1, the pump rod 22 is assembled to the body valve 40 and a fixing member 45 is then press-fitted into the body valve 40 in order to prevent the pump rod 22 from escaping. In this structure, however, it is apprehended that the fixing member 45 may escape during the use of the shock absorber.

BRIEF SUMMARY

The present disclosure describes embodiments directed to solving the aforementioned problems in the prior art. An object of embodiments of the present disclosure is to provide a self leveling shock absorber, wherein an installing location of a relief valve included in the shock absorber is deformed to prevent the relief valve from escaping and securely maintain an assembling condition of a pump rod.

According to one embodiment, there is provided a self leveling shock absorber, which comprises a base shell; an inner tube installed in the base shell, the inner tube having a low pressure chamber defined between the base shell and the inner tube; a piston rod installed in the inner tube and having a hollow portion with an upper portion closed; a piston valve coupled to an end of the piston rod to divide an internal space of the inner tube into a rebound chamber and a compression chamber; an outer tube installed to a lower portion of an outside of the inner tube, the outer tube having a high pressure chamber and a gas chamber defined between the base shell and the outer tube, the high pressure chamber being divided from the gas chamber by a diaphragm; a body valve installed to a lower end of the inner tube to control flow of fluid between the low pressure chamber and the high pressure chamber; a pump rod having a hollow portion therein and having one end installed to the body valve and the other end inserted into the hollow portion of the piston rod; and a relief valve installed to the body valve under the pump rod to return surplus fluid in the high pressure chamber to the low pressure chamber.

In one aspect, the relief valve includes a seat fixedly press-fitted into the body valve and having a through hole; a ball seated on the seat to close the through hole; and a ball support and an elastic member for compressing the ball toward the seat.

In one aspect, the elastic member is in contact with a lower end surface of the pump rod to compress the pump rod.

In one aspect, a leaf spring, which has elasticity and is in contact with the body valve, is installed on an external circumference surface of a lower end of the pump rod, whereby the pump rod is prevented from escaping from the body valve by the elasticity of the elastic member and the leaf spring.

DETAILED DESCRIPTION

Figure 2:
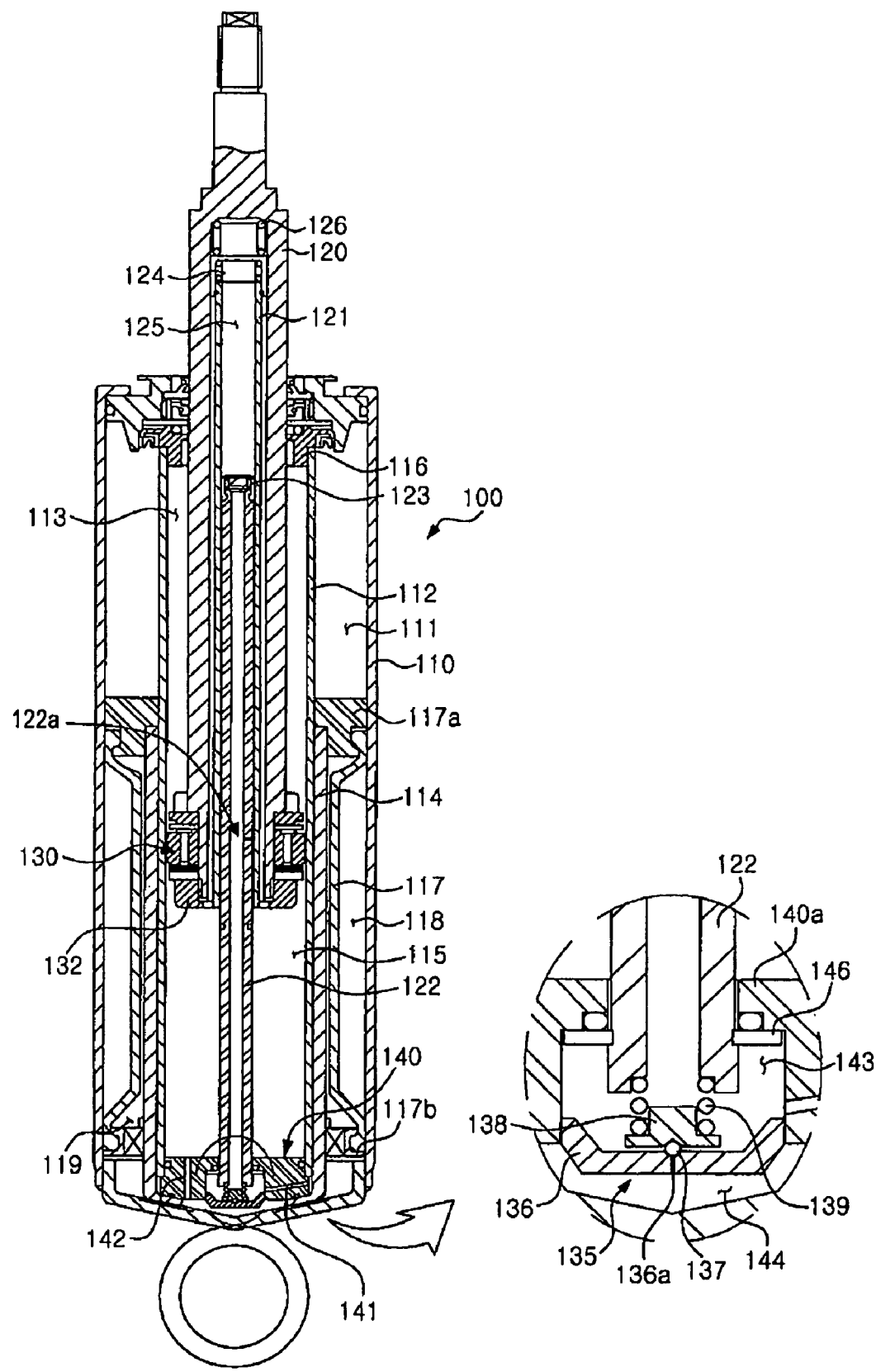
FIG. 2 is a cross-sectional view of a self leveling shock absorber according to one embodiment.

Hereinafter, a self leveling shock absorber according to one embodiment will be described in detail with reference to FIG. 2. FIG. 2 is a cross-sectional view of a self leveling shock absorber according to one embodiment.

As shown in FIG. 2, a self leveling shock absorber 100 includes a base shell 110 and an inner tube 112 installed in the base shell 110. A low pressure chamber 111 is defined between the base shell 110 and the inner tube 112.

A piston rod 120 is installed in the inner tube 112 such that a lower portion of the piston rod is movable therein. The movement of the piston rod 120 is guided by a rod guide 116 coupled to an upper end of the inner tube 112. In addition, the piston rod 120 has a hollow portion with an upper portion closed. A piston valve 130 is coupled to an end of the piston rod 120 through a nut 132. The piston valve 130 divides an inner space of the inner tube 112 into a rebound chamber 113 and a compression chamber 115 and controls the flow of oil between the rebound chamber 113 and the compression chamber 115 to generate damping force.

Also, in order to adjust vehicle height, a pump tube 121 is installed in the space defined in the piston rod 120. In addition, a hollow pump rod 122 is inserted into the pump tube 121, and a pump chamber 125 is defined in an empty space between the pump tube 121 and the pump rod 122. A leveling port 122a is formed to pass through an intermediate portion of the pump rod 122 in a transverse direction. Furthermore, a gap, such as a fine gap, is defined between the pump tube 121 and a surface of the piston rod 120 defining the hollow portion. This gap is positioned below the leveling port 122a.

An inlet valve 123 is provided at an upper end of the pump rod 122, and an outlet valve 124 which is opened and closed by up/down movement of the piston rod 120 is provided at an upper end of the pump tube 121. The outlet valve 124 is supported by a first spring 126 provided over it. The oil introduced into the pump chamber 125 causes the outlet valve to compress the first spring 126 and to be open.

Further, an outer tube 114 is installed to a lower portion of an outside of the inner tube 112. A holder 117a, which is in contact with an inner circumference surface of the base shell 110, is coupled to an upper end of the outer tube 114. The holder 117a, base shell 110 and inner tube 112 define at least a portion of the low pressure chamber 111. A fine gap is defined between the inner tube 112 and the outer tube 114 so that the low pressure chamber 111 communicates with a lower portion of the inner tube 112.

The low pressure chamber 111 which is configured to be filled with oil is defined between the base shell 110 and the inner tube 112. A gas chamber 118 and a high pressure chamber 119, which are separated from each other by a diaphragm 117, are provided between the base shell 110 and the outer tube 114. The high pressure chamber 119 is compressed by the gas chamber 118.

Upper and lower ends of the diaphragm 117 are restrained by the upper holder 117a and a lower holder 117b vertically installed between the outer tube 114 and the base shell 110.

Figure 1:
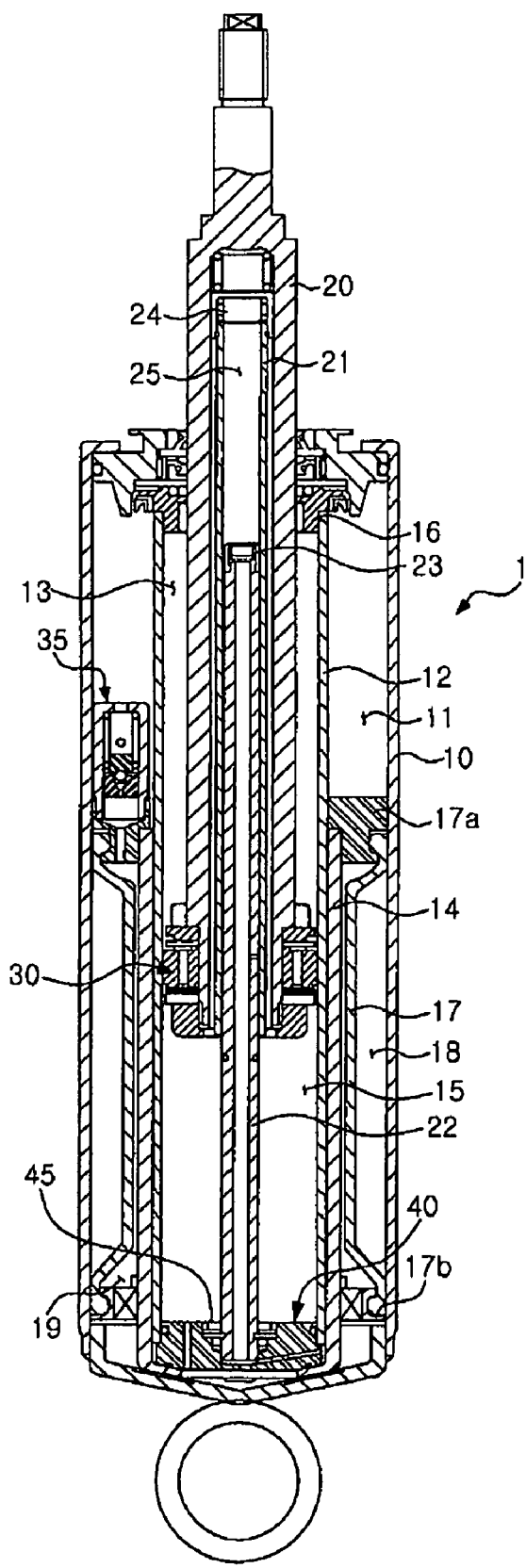
FIG. 1 is a cross-sectional view of a self leveling shock absorber according to a prior art.

In case of a prior self leveling shock absorber, such as that shown in FIG. 1, installed to the upper holder 17a is a relief valve 35, which allows oil in the high pressure chamber 19 to return to the low pressure chamber 11 to reduce the pressure in the high pressure chamber 19 when the pressure in the high pressure chamber 19 is excessively increased. In embodiments of the present disclosure, however, a relief valve 135 performing the aforementioned function is installed to a body valve 140.

The body valve 140 is installed to a lower end of the inner tube 112. A body 140a of the body valve 140 is formed with a first space 143 and a first flow passage 141 providing a flow path for allowing the pump chamber 125 connected to the hollow portion in the pump rod 122 to communicate with a gap between the inner tube 112 and the outer tube 114.

In addition, the body 140a of the body valve 140 is formed with a second flow passage 142 and a second space 144 providing a flow path for allowing the compression chamber 115 to communicate with the high pressure chamber 119.

The first space 143 and the second space 144 are divided from each other by a seat 136 of the relief valve 135. According to one embodiment, the relief valve 135 includes the seat 136 dividing the first space 143 and the second space 144 from each other, a ball 137 seated on the seat 136, and a ball support 138 and a second spring 139 for compressing the ball 137 toward the seat 136.

The seat 136 is formed with a third flow passage 136a for allowing the first space 143 to communicate with the second space 144. Normally, the third flow passage 136a is closed by the ball 137. However, when the pressure in the high pressure chamber 119 is abnormally increased, the ball 137 and the ball support 138 are compressed by the pressure therein and compress the second spring 139, so that the third flow passage 136a can be opened.

The second spring 139 is in contact with a lower end surface of the pump rod 122, and a leaf spring 146 having certain elasticity is installed around an outer circumference surface of a lower end of the pump rod 122 in order to prevent the pump rod 122 from escaping. Cooperation of the second spring 139 and the leaf spring 146 surely prevents the pump rod 122 from escaping from the body 140a of the body valve.

According to one embodiment, after the pump rod 122 is inserted into a lower portion of the body 140a of the body valve 140 and assembled, the relief valve 135 is assembled. For example, after the pump rod 122 is inserted until the body 140a of the body valve comes into contact with the leaf spring 146 fixedly installed to a lower end of the pump rod 122, the second spring 139, the ball support 138 and the ball 137 constituting the relief valve 135 are sequentially stacked and finally the seat 136 is compressed, so that the pump rod 122 and the relief valve 135 are completely assembled.

According to one embodiment, therefore, since the second spring 139 is mounted to the lower end surface of the pump rod 122, slight rotation may be generated between the pump rod 122 and the pump tube 121. As a result, although lateral force is applied to the shock absorber 100, a vertical slide between the pump tube 121 and the pump rod 122 may be smoothly performed.

Since the relief valve 135 is installed to the body valve 140 under the pump rod 122, the relief valve 135 can be fundamentally prevented from escaping and a space for mounting the relive valve 135 can be advantageously secured.

The operation of the self leveling shock absorber 100 so configured will be illustrated as follows.

In the self leveling shock absorber 100, at an initial state where oil introduced through the leveling port 122a of the pump rod 122 makes the inlet valve 123 and the outlet valve 124 open to allow the piston rod 120 to move upward, if passengers take the vehicle or a cargo is loaded thereon, the piston rod 120, which has moved upward in the initial state, moves downward.

In this state, when the vehicle is driven, the piston rod 120 is reciprocated in the inner tube 112 so that a difference in pressure between the rebound chamber 113 and the compression chamber 115 is generated. The pressure difference causes oil to flow through the piston valve 130 and the body valve 140, and simultaneously, the oil starts to be pumped through the pump tube 131 and the pump rod 122.

That is, during the rebound stroke, the oil in the low pressure chamber 111 makes the inlet valve 123 open through the first flow passage 141 and the first space 143 and is introduced into the pump chamber 125 to move the piston rod 120 upward. The oil in the rebound chamber 113 flows into the compression chamber 115 to generate damping force through the piston valve 130.

During the compression stroke, the oil in the pump chamber 125 flows into the compression chamber 115 through the gap between the piston rod 120 and the pump tube 121, and the oil in the compression chamber 115 flows into the rebound chamber 113 through the piston valve 130 or into the high pressure chamber 119 through the second flow passage 142 and the second space 144.

As described above, as the oil is continuously pumped into the high pressure chamber 119, the diaphragm 117 is compressed so that the pressure in the gas chamber 118 is increased. In addition, if the oil stops flowing into the high pressure chamber 119, the diaphragm 117 is restored to its origin state by the pressure in the gas chamber 118, which discharges the oil in the high pressure chamber 119 to the pump chamber 125. Accordingly, the piston rod 120 is pushed and moves upward, so that a vehicle height is always adjusted regularly.

According to embodiments of the present disclosure, an installing position of the relief valve contained in the self leveling shock absorber is configured to prevent the relief valve from escaping and securely maintain an assembling condition of the pump rod.

In addition, according to embodiments of the present disclosure, a spring is arranged under the pump rod as the installing position of the relief valve is changed to the body valve, so that the rotation of the pump rod can be allowed within a certain range. Thus, the sliding movement between the pump tube and the pump rod can be performed smoothly even though lateral force is exerted on the shock absorber.

Furthermore, according to embodiments of the present disclosure, an assembling method of the pump rod is changed as the installing position of the relief valve is changed to the body valve, whereby the pump rod guide member can be surely prevented from escaping.

Although the self leveling shock absorber according to the present invention has been described with reference to the exemplary drawings, the present disclosure is not limited to the aforementioned embodiment and drawings. It will be apparent that those skilled in the art can make various modifications and changes thereto within the scope of the invention defined by the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A self leveling shock absorber comprising:
   a base shell;
   an inner tube installed in the base shell,
   a low pressure chamber defined between the base shell and the inner tube;
   a piston rod installed in the inner tube and having a hollow portion and an upper portion that is closed;
   a piston valve coupled to an end of the piston rod to divide an internal space of the inner tube into a rebound chamber and a compression chamber;
   an outer tube installed to a lower portion of an outside of the inner tube,
   a high pressure chamber and a gas chamber defined between the base shell and the outer tube;
   a diaphragm separating the high pressure chamber from the gas chamber;
   a body valve installed to a lower end of the inner tube to control flow of fluid between the low pressure chamber and the high pressure chamber;
   a pump rod having a hollow portion therein and having a first end installed to the body valve and a second end, opposed to the first end, inserted into the hollow portion of the piston rod; and
   a relief valve installed to the body valve under the pump rod to return surplus fluid in the high pressure chamber to the low pressure chamber, the relief valve including a seat fixedly coupled to the body valve and having a through hole, a ball seated on the seat to close the through hole, and a ball support and an elastic member to compress the ball toward the seat,
   wherein the elastic member is in contact with a lower end surface of the pump rod to compress the pump rod.

2. The self leveling shock absorber as claimed in claim 1, further comprising:
   an elastic leaf spring in contact with the body valve and positioned on an external surface of a lower end of the pump rod, the elastic member and the leaf spring preventing the pump rod from escaping from the body valve.

* * * * *